Figure 1:
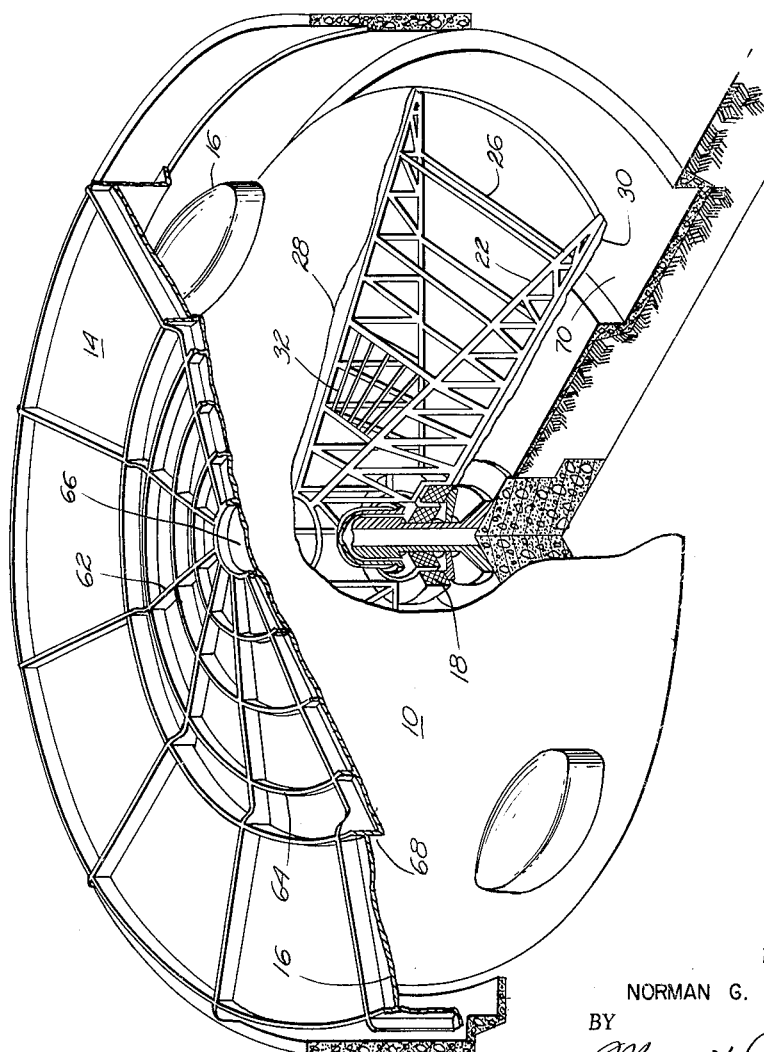

Sept. 14, 1965 N. G. FROOMKIN 3,205,696
PRECISION ROTARY ACCELERATOR

Filed July 7, 1961 4 Sheets-Sheet 1

INVENTOR.
NORMAN G. FROOMKIN
BY
Morse & Altman
ATTORNEYS

Sept. 14, 1965  N. G. FROOMKIN  3,205,696
PRECISION ROTARY ACCELERATOR

Filed July 7, 1961  4 Sheets-Sheet 2

INVENTOR.
NORMAN G. FROOMKIN
BY
*Morse & Altman*
ATTORNEYS

INVENTOR.
NORMAN G. FROOMKIN
BY
*Morse & Altman*
ATTORNEYS

Sept. 14, 1965     N. G. FROOMKIN     3,205,696

PRECISION ROTARY ACCELERATOR

Filed July 7, 1961     4 Sheets-Sheet 4

INVENTOR.
NORMAN G. FROOMKIN
BY
*Morse & Altman*
ATTORNEYS 3,205,696
PRECISION ROTARY ACCELERATOR
Norman G. Froomkin, 100 Memorial Drive,
Cambridge, Mass.
Filed July 7, 1961, Ser. No. 122,460
9 Claims. (Cl. 73—1)

This invention relates in general to precision rotary accelerators and more particularly concerns a high capacity centrifuge characterized by a hydrostatically supported conical rotor of inherently high vertical rigidity and torsional stiffness and low operating disturbances.

According to present practice, high capacity centrifuges utilize a solid or trussed beam mounted horizontally on a spindle and rotated through a gear train by means of a high pressure, hydraulic reciprocating motor or variable speed electric motor. In many of these machines, the radial arm may extend more than twenty feet with a capability of generating forces in excess of 100 "G." Because of basic design and operating considerations the beam type centrifuge is entirely unsatisfactory for testing advanced inertial components. This is due in part to the low flexural rigidity of the beam and also in part to aerodynamic drag and buffeting created by the rotating beam.

Furthermore, the perturbances transmitted to the test piece form the reciprocating hydraulic or rotating electric motor, from the large anti-friction bearings and from the speed reducing gears militate against the obtaining of information of any precision from the equipment.

Accordingly, it is an object of the present invention to provide a high capacity precision rotary accelerator that is substantially free from operational disturbances.

Another object of this invention is to provide a high capacity rotary accelerator in which the test platform has high vertical rigidity and displays very high torsional stiffness about its radius of rotation.

Yet another object of this invention is to provide means for mounting and driving the rotor of an accelerator so as to avoid introducing augmenting forces into the apparatus.

Still another object of this invention is to provide in a rotary accelerator a conical rotor characterized by a relatively low aerodynamic drag.

More particularly, this invention features a precision rotary accelerator of high capacity in which the rotor is a surface of revolution, axially mounted for rotation about a hydrostatic bearing and rotated by a direct spindle drive electric brushless torque motor. As another feature of this invention, the rotor is mounted within a housing having a configuration which generally conforms in spaced relation to the contours of the centrifuge to minimize aerodynamic drag of the rotor.

Figure 2:
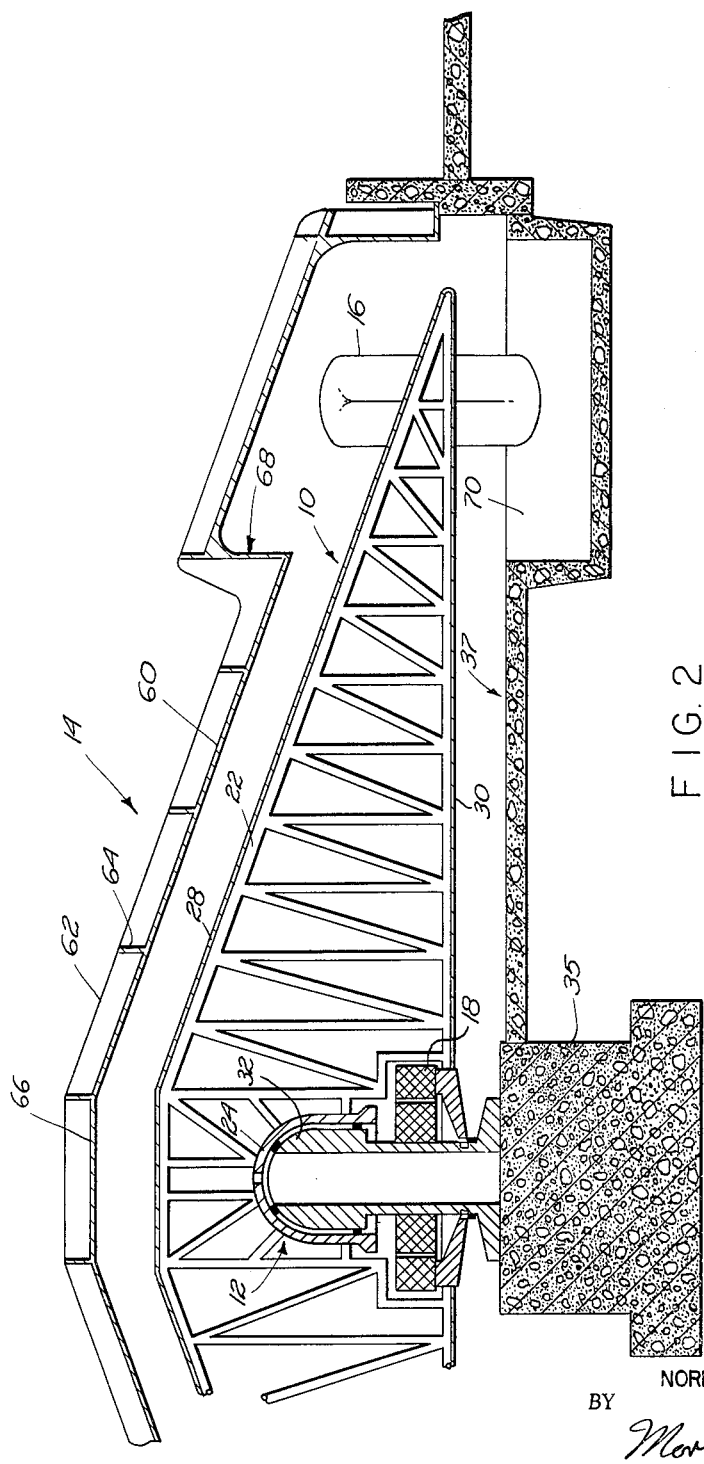
Figure 3:
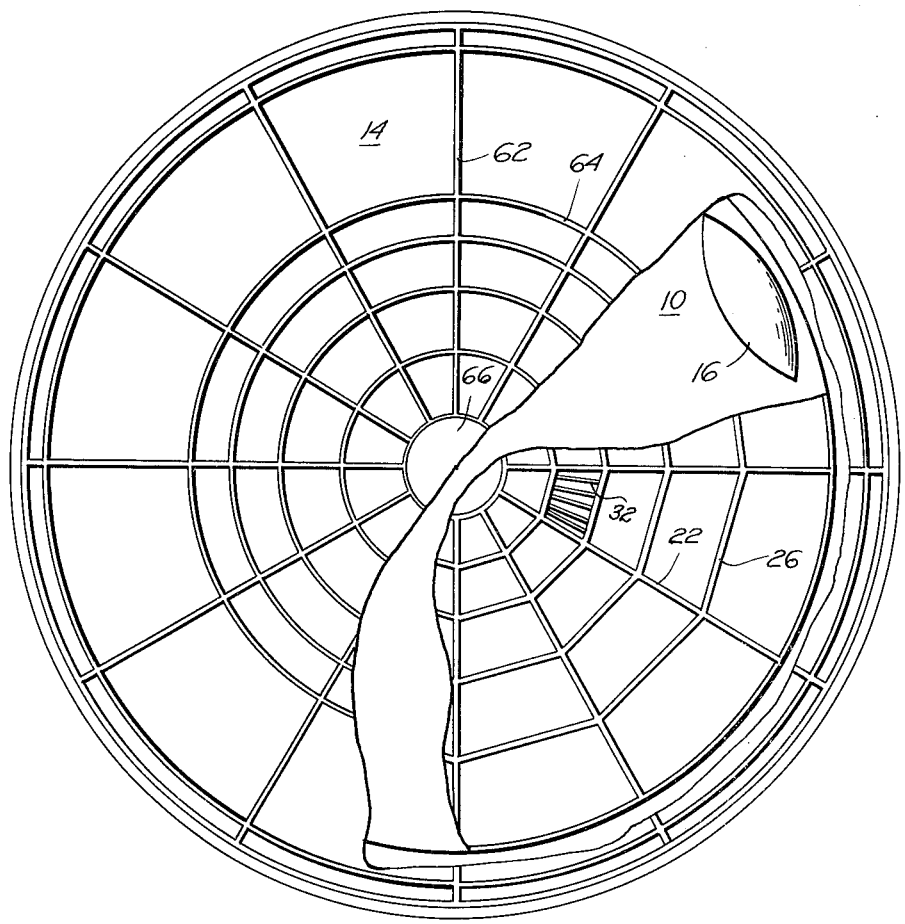
Figure 4:
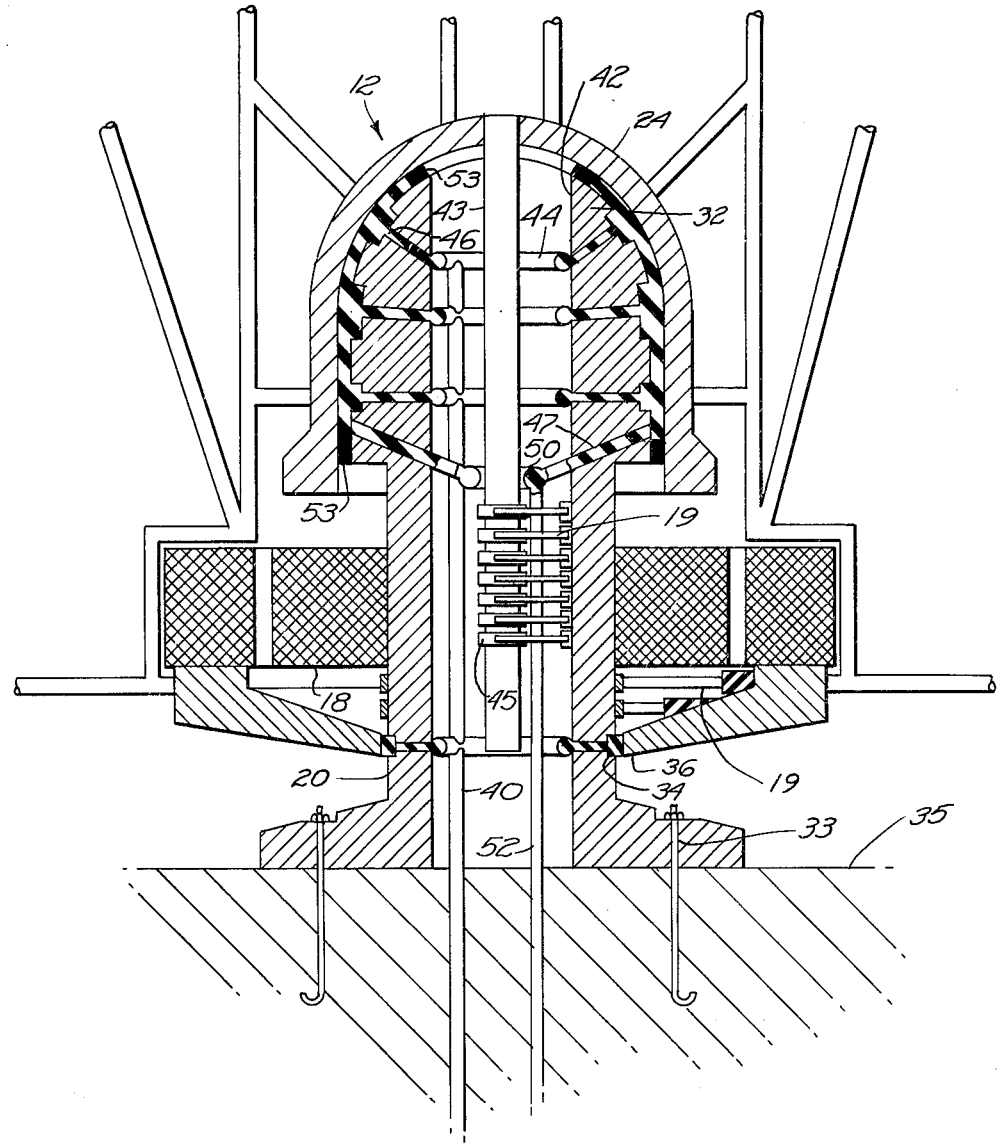

But these and other features of the invention along with further objects and advantages thereof, will become more fully apparent from the following detailed description taken in connection with the accompanying drawings in which:

FIG. 1 is a view in perspective, with parts broken away to show details of construction, illustrating a precision rotary accelerator made according to the invention, FIG. 2 is a cross-section taken along the line 2—2 of FIG. 1, FIG. 3 is a top plan view of the apparatus shown in FIG. 1 with portions broken away to show details of construction, and FIG. 4 is an enlarged sectional view in side elevation of the hydrostatic bearing assembly.

Referring now to the drawings, there is illustrated a rotary accelerator with the reference character 10 generally indicating a rotor horizontally mounted on a hydrostatic bearing assembly 12 and enclosed by a cylindrical housing 14. The rotor 10 is in the form of a frustum of a right circular cone and serves as a test platform for inertial components mounted within aerodynamically contoured pods 16 located at the periphery of the conical rotor 10.

A sidereal type 300 or 400 H.P., D.C. torque motor 18 has its stationary armature directly connected to a bearing spindle 20 to drive the rotor frictionlessly about its vertical axis. The field windings are mounted on the rotor frame and are excited through a slip ring and brush assembly 19.

The conical rotor 10, in a preferred embodiment and as best shown in FIG. 2, is an aluminum structured frustum of a 20° base angle, right circular cone, with the large circle downward. A plurality of triangular beams 22 are evenly spaced in radial array about the rotor 10 and are connected in cantilever arrangement to a spherical rotor bearing cap 24 mounted over the fixed spindle 20. These beams may be trussed as shown, or of lightened sheet web construction and fabricated from aluminum alloy or other material having a high weight to strength ratio.

The internal framework for the rotor also includes a series of concentric stiffeners 26 joining adjacent beams 22 and extending beneath a conic upper skin 28 and a lower circular skin 30. Both the upper conic skin 28 and the lower circular skin 30 may be fabricated from $\frac{1}{16}$ inch duraluminum sheet material with a number of stringers 32 distributed beneath the conical skin 28 to define and maintain the aerodynamic configuration of the rotor and thus hold parastic drag to design limits. Typically, the rotor may be constructed with a 32 foot nominal and 35 foot actual radius with the test object being located in the pod 16 of the 32 foot nominal radius. At 68 r.p.m. of the rotor, the test object will experience 50.5 G with a 6.2 G gradient over a presumed four foot radial length of a typical test object.

The pods 16 are shown mounted directly opposite one another slightly inward of the peripheral edge of the rotor 10 and arranged parallel to the axis of rotation. The pods may be 8 feet in length and 15 feet in chordal length double convex (3:1 F.R.) neutral lift air foils with a height of eight feet to allow for vertical adjustment of the centroids of the test pieces and counterweights during automatic dynamic balancing. Obviously, the rotor may be so constructed as to accommodate additional pods if desired.

Radial and vertical support for the rotor 10 is furnished by the stationary spindle 20 which may be a hollow Meehanite casting having a 1.5 foot radius hemispherical top portion 32 and a two foot diameter journal section 34 near the base. These serve as the precise and stable foundations for hydrostatic self-centering thrust and radial bearings. The mating bearing cap 24 together with a frusto-conical radial support carrying a cylindrical bearing element 36 are attached to and revolve with the rotor, with the entire vertical load being sustained by the spherical bearing portion 32 and cap 24 and a portion of the radial load being accommodated by the lower bearing elements.

With a spherical bearing such as this, the accelerator rotor may be tilted for leveling purposes and the orientation of the axis of rotation can be fixed by means of the cylindrical fluid journal bearing 34.

The mushroom base of the spindle is anchored by means of a series of J rods 33 onto a seismic concrete footing 35 resting on a stabilized foundation bed isolated from a pit 37 within which the apparatus is mounted.

Projecting downward from the female spherical bearing cap 24, and entering coaxially into a bore 42 formed axially through the spindle 20 is a tubular column 43 carrying fluid swivel valves (not shown) and a bank of slip rings 45. Brush assemblies and fluid swivel nozzles are mounted to suitable brackets in the spindle bore. It will be understood that these brushes and slip rings serve as rotary electrical connections for the various circuits associated with the operation of the accelerator and the test piece.

Penetrations in the spindle rotor structure and skin are provided for optical sighting to detect rotor wobble and other test piece and accelerator positional deviations from the desired normal.

Capillary compensated hydrostatic bearings may be employed in the spindle. Such bearings process very high stiffness and load capacity while maintaining extreme smoothness of action and freedom from stray torques, static friction and camming action characteristic of anti-friction or rolling contact bearings. Preferably, these bearings should be capillary compensated rather than orifice compensated since capillary compensated bearing characteristics are independent of changes in fluid viscosity. Bearing performance is thus independent of changes in bearing temperatures.

Drag losses are maintained at a low level by utilizing a bearing of minimum diameter lubricated by low viscosity oil. At the same time bearing rigidity is maximized by operating with a high oil pressure within the bearing. Preferably, liquid should be employed in the fluid bearing since it will tend to stabilize the rotor structure and provide a damping effect. Gas, specifically air, may be used since it offers the advantage of cleanliness and extremely low friction drag although it is considered to be inferior to liquid because of the low damping associated with a gas film.

In any event, the fluid medium is introduced between the bearing surfaces by means of one or more conduits 40 passed through the axial bore 42.

These conduits connect with a series of annular manifolds 44 mounted on the walls of the bore 42. The manifolds in turn communicate with an array of feed lines 46 which extend to the bearing elements located about the outer surface of the spindle. A gravity return system for the fluid includes branch lines 47 communicating at one end with between the bearing surfaces and below the feed lines 46, and at the other end with an annular manifold 50 which drains through a conduit 52 to a sump (not shown). A similar system is provided for the lower journal bearings 34, 36. Upper and lower seals 53 are provided to prevent the fluid from leaking past the ends of the bearings.

In the illustrated embodiment, the total weight of all rotating elements is approximately 35,000 lbs. In order to obtain maximum stiffness from the hydrostatic bearing, the supply pressure for the liquid should be 130 p.s.i.g. The projected areas of the spherical bearing which is assumed to extend from 22.5° to 67.5° above the horizontal, are calculated as follows:

The vertical projected area (cylindrical) is $$A_v = R^2 [sin\ (22.5°) + cos\ (67.5°)]$$
$$[cos\ (22.5°) - cos\ 67.5°]$$
$$A_v = 1.6\ ft.^2$$

The horizontal projected area is $$A_h = \pi R^2 [cos^2\ (22.5°) - cos^2\ (67.5°)]$$
$$A_h = 5.04\ ft.^2$$

Since the thrust load to be carried over the area is 35,000 lbs. the average pressure $P_h$ acting over the area $A_h$ must therefore, be $$(P_h)\ avg. = \frac{35,000\ lbs.}{5.04 \times 144\ in.^2} = 432\ p.s.i.g.$$

Typically, with a pocket-type bearing, the average pressure on the bearing surface will be two thirds of the pressure in the pockets. Thus the maximum pressure in the bearing film $(P_h)$ max. will be approximately $(P_h)$ max. —65 p.s.i.g.

For an optimized fluid bearing, the stiffness (load per unit deflection) of the bearing in thrust can be estimated from the following expression.

$$\frac{K_{sh}}{P_s A_H} = 0.25$$

where $K_s$ = bearing rigidity, lb./in.
$P_s$ = supply pressure, p.s.i.g.
$A_h$ = projected bearing area, in.$^2$
$H$ = clearance, in.

Assuming the clearance (radial) to be $2 \times 10^{-3}$ inches, the estimated stiffness is $$K_s = 11.8 \times 10^6\ lbs./in.$$

This stiffness is large compared with the structural rigidity of the rotor system.

The projected area of the lower cylindrical journal bearing 34 is, assuming a length of 1 ft., $$A_j = 1\ ft.$$

Assuming that this bearing is also optimized and supplied with fluid at 130 p.s.i.g., the stiffness is given approximately as $$\frac{K_{sh}}{P_s A_j} = 0.5$$

This stiffness relationship is twice as large as given for the thrust bearing because the radial bearing has two sides pressurized whereas the axial thrust bearing is unidirectional.

For the journal bearing, assuming a radial clearance of $2 \times 10^{-3}$ in.

$$(K_s)\ journal = 4.7 \times 10^6\ lb./in.$$

The radial stiffness of the spherical bearing is estimated in the same way to be equal to $$(K_s)\ \substack{radial \\ sphere} \cong \frac{PSAV \times 0.5}{h} = 7.5 \times 10^6\ lb./in.$$

The combined radial stiffness of the spindle bearings is, therefore $$(K_s)\ radial = 12 \times 10^6\ lb./in.$$

The most critical requirement placed on the bearing support is in connection with resistance to tilting of the axis of rotation. Loading which tends to produce such motion can be minimized by dynamic balancing of the rotating system and by locating the radial bearing surfaces so that the unbalance loads applied at the most likely location (e.g., near the midpoint of the pod 16) will not tend to tilt the rotor axis. Some tilting moments will necessarily remain, however, and the spindle bearings should be as rigid as possible with respect to axis tilt.

For the bearing parameters established above, the rigidity of the bearing system to vertical loads applied at the pod 16 (32 ft. radius) can be calculated by torque equilibrium, $$32F = 4R$$

From the equation for the journal bearing above, $$(K_s)\ journal = 4.7 \times 10^6\ lb./in.$$
$$R = (K_s)\ journal \times (\Delta h)\ journal$$

Or combining the above equations.

$$(\Delta h)\ journal = \frac{SF}{(K_s)}\ journal = \frac{SF}{4.7 \times 10^6}$$

Since it is desired that the pod 16 should not deflect more than one minute of arc under a load of 2,000 pounds, we see from the above equation $$S = \frac{64 \times 2000}{4.7 \times 10^6} = 27.2 \times 10^{-3} = 0.028\ in.$$

In terms of angular deflection $\phi$, this represents $$\phi = \frac{S}{32 \times 12} = 0.250 \text{ minute of arc under 2,000 pounds load.}$$

Since the bearings will be lightly loaded in the radial direction, the rotor will be centered on the spindle and employed. The simple Petroff equation may be employed to calculate the drag of the bearing.

For the lower journal bearing, $$\tau = \mu \frac{Wr}{h}$$

where
- $\tau$ = shear stress
- $\mu$ = liquid viscosity
- $W$ = speed of rotation = $7\pi/3$ rad./sec.
- $r$ = journal radius — 12 in.
- $h$ = radial clearance = $2 \times 10^{-3}$ in.

A representative oil viscosity is taken to be $$2 \times 10^{-5} \text{ lbs.—sec./in.}^2$$

The drag movement $Mj$ for the journal is, therefore $$Mj = 2\pi r^2 1 T = \frac{2\pi r^3 1 W \mu}{h}$$

where 1 is the length of the journal (12 inches).

When the selected parameter values are substituted into the above equation $$Mj \cong 800 \text{ ft.-lbs.}$$

In a similar fashion the upper spherical bearing drags $Ms$ is estimated to be $$Ms \cong 680 \text{ ft.-lbs.}$$

These estimates of drag assume that a total coverage of the bearing surface by a $2 \times 10^{-3}$ inch thick oil film is obtained. Due to the presence of pockets in the bearing surface, these drag figures may, therefore, be reduced by about a factor of two. The total viscous drag of the two bearings $Mb$ is, therefore $$Mb \frac{Ms + M1}{2} \cong 740 \text{ ft.-lbs.}$$

and the frictional power required is $$Pb = Mbw \cong \frac{740 \times 7\pi}{550 \times 3} \cong 10 \text{ H.P.}$$

Referring now to the frusto-conical rotor 10, it may be said, in general, that an accelerator design which is based upon a surface of revolution possesses aerodynamic characteristics which are superior to the aerodynamic characteristics of the conventional rotating beam device. Since the main rotating structure is a surface of revolution, aerodynamic pressure forces acting on the main structure will be very small. Any pressure forces which do exist will tend to cancel each other out because of rotational symmetry. Thus, the problems of torsional deflection due to offset between the center of pressure and the center of twist which occur in a beam centrifuge are essentially eliminated by the use of a circular accelerator.

The conical rotor is much more rigid than a cantilevered beam construction and this increased rigidity, together with the symmetry of the circular configuration prevents the occurance of vibration induced by coupling between aerodynamic forces and structural flexibility. This type of oscillation is prone to occur in a long beam-like arrangement, and may be very difficult to eliminate without the introduction of spoilers which will cause large increases in the windage drag of the beam. Although the exposed surface area of the circular accelerator is necessarily many times larger than the area of the beam-type accelerator, the drag is comparable with that of a beam of the same diameter.

Since the conical rotor is comparable to a simple disk in terms of drag, we may express the drag moment M on a disk of radius R rotating at speed W in a medium of density $\varphi$ in the following form which includes both sides of the disk.

$$C_m = \frac{2M}{\frac{1}{2}\varphi W^2 R^5}$$

when $C_m$ is a dimensionless moment coefficient. For the proposed geometry and speed, and for operation in air, $$W = 70 \text{ r.p.m.} = \frac{7\pi}{3} \text{ rad./sec.}$$

$$\varphi = 2.27 \times 10^{-3} \text{ lb.-sec. 2/ft.}^4$$

$$R = 35 \text{ ft.}$$

Thus, $$M = 1625 \times 10^3 C_m \text{ ft.-lbs.}$$

The value of the moment coefficient depends on the Reynolds number of the disk, on the surface roughness of the disk and on the location of the housing walls present.

The Reynolds number $Re$ is $$Re = \frac{UR}{V}$$

For air, $V$ = kinematic viscosity = $1.92 \times 10^{-4}$ ft.$^2$/sec. The radius $R = 35$ ft. and the tip velocity $$U = WR = 257 \text{ ft./sec.}$$

Thus $$Re = 4.68 \times 10^7$$

At this value of the Reynolds number, the boundary layer on the disk will be turbulent and the value of the moment coefficient $Cm$ for a smooth walled rotor with a housing will be $Cm = 0.0022$. Based on the above, the rotor drag may be calculated as $$M \text{ disk} = 3580 \text{ ft. lbs.}$$

The power required at 70 r.p.m. due to drag on the disk is, therefore, $$P \text{ cone} = MW = \frac{3580 \times 7\pi}{3 \times 550} = 48 \text{ H.P.}$$

In comparison, the drag for a beam section of diameter equal to the cone conservatively would be 2760 ft.-lbs. with a power requirement of 37 H.P.

With regard to the pods 16, it is preferable that they define a symmetrical airfoil shape having a fineness ratio of three to one. Since the direction of the relative velocity between the airfoil and the air is constant (except for the action of vortices or turbulences set up by the following airfoil) it is possible to use an airfoil section which has a rather sharp leading edge. If the airfoil is made symmetrical, the centrifuge can be rotated in either the clockwise or counter-clockwise direction. By locating the point of maximum thickness of the airfoil at the mid-chord position, the tendency of the boundary layer to separate and produce large drag is retarded. This low drag shape is only possible here because the airfoil always operates at essentially zero angle of attack.

Assuming a drag coefficient of approximately 0.02, which is typical for a conventional airfoil section operating at zero angle of attack, the drag on the pod 16 may be computed as follows:

The projected area of the test pods 16 is $$Ap = 45 \text{ ft.}^2 \text{ per pod}$$

The drag force is $$Fd = \frac{1}{2}\varphi(WR)^2 Ap Cd$$

Where $$\varphi = 2.27 \times 10^{-3} \text{ lb.-sec.}^2/\text{ft.}^4$$

$$W = \frac{7\pi}{3} \text{ rad./sec.}$$

$$R = 32 \text{ ft.}$$

Therefore, $$Fd = 56 \text{ lbs.}$$

and the moment $Mh$ due to two pods is $$Mh = 2FdR = 3580 \text{ ft.-lbs.}$$

The power required to revolve the pods $Ph$ at 70 r.p.m. is $$Ph = \frac{3580 \times 7\pi}{550 \times 3} = 48 \text{ H.P.}$$

The total aerodynamic drag power can be calculated by adding the power due to the pod drag to the power due to the cone surface drag $$P \text{ drag} = P \text{ cone} + Ph = 96 \text{ H.P.}$$

Under a static load of 2,000 lbs. applied at the tip of the rotor vertical deflection will not exceed 1 minute of arc or, for the assumed 32 foot base circle radius, a deflection of not more than ⅛ inch. This may be easily established geometrically by considering any one of the trussed beams 22 before and after loading. From static the force in the upper angular arm of the triangular beam 22 will be 5047.6 lbs. in tension while the lower horizontal arm will be 5494.9 lbs. in compression.

As regards the dynamic characteristics of the loaded conical rotor we may consider the design for the centrifugal force under an acceleration of "50 G" with a concentrated load of 600 lbs. applied at the tip of the truss. While the upper and lower arms of the triangular beam will share the inertia load due to the masses of the members and the tip load, we may assume that only the lower member takes the inertial loads due to its own mass and the total tip load.

Considering a beam of variable section $A(r)$ at any point $r$, we can express the elementary centrifugal force, $dw$, as $$dw = \varphi A(r) a(r) dr$$

where $\varphi$ = mass density of the material $A(r)$ = cross sectional area at $r$ $a(r)$ = acceleration $ar = \frac{50gr}{R}$ Upon substituting of $A(r)$ and $a(r)$ and integrating, we obtain the centrifugal force at any point $r$, along the member as $$w(r) = \frac{50g\varphi}{R} \int_r^R A(r) r \, dr$$

The total tension at $r$ is $W(r) + 600 \times 50$. With the member designed for constant strength and letting $S$ represent the working stress, we have $$S = \frac{W(r) + 30,000}{A(r)}$$

From the above, we obtain the governing differential equation for the cross sectional area as $$\frac{dA(r)}{dr} + \frac{50g\varphi}{RS} r A(r) = 0$$

Solving this, we have $$A(r) = C_1 e^{\frac{-50G\varphi}{RS} \frac{R2}{2}}$$

The constant of integration $C_1$ can be determined from the following integral equation $$A(r) S - 30,000 = \frac{50g\varphi}{R} \int_r^R A(r) r \, dr$$

From the above, we may write, $$\int_r^R A(r) r \, dr = C_1 \int_r^R e^{\frac{-50g\varphi}{RS} \frac{r^2}{2_{\text{rdr}}}} =$$

$$C_1 \left(\frac{-RS}{50g\varphi}\right) \left[ e^{\frac{-50g\varphi}{s} \frac{R}{2}} - c e^{\frac{-50g\varphi}{RS} \frac{L2}{2R}} \right]$$

Substitution yields $$C_1 = \frac{30,000}{S} e^{\frac{50g\varphi}{S} \frac{R}{2}}$$

Thus we may write, $$A(r) = \frac{30,000}{S} e^{\frac{25g\varphi}{RS}(R^2 - r^2)}$$

Examining a section at the top where $r = R$ we find $$A(R) \frac{30,000}{S}$$

and at the root where $r = 0$ we find $$A(0) = \frac{30,000}{S} e^{\frac{25g\varphi}{S}}$$

For a given material, the above quantities can be computed. Approximations indicate that these quantities are near to the area determined by static conditions.

One can also compute the radial displacement, $\Delta R$, as $$\Delta R = \int_0^R \frac{W(r) + 30,000}{A(r) E} dr = \frac{S}{E} R$$

For example, for $E = 30 \times 10^6$ p.s.i., $S = 30,000$ p.s.i. and $R = 408''$, we obtain $\Delta R = 0.408''$.

It is seen that the centrifugal force lengthens the horizontal member which reduces its compressible stress.

Vibration analysis of the system indicates that the fundamental frequency is of the order of 8 cycles per second. Assuming a concentrated force of 600 lbs. attached to the top and the system is spinning at a 50 "G" condition the governing differential equation may be derived by summing up the forces in the vertical direction. Let $I(r)$ be the inertial distribution along $r$ and $M_1$ be the force applied at the tip. The resulting equation can be written as, $$\frac{\partial^2}{\partial r^2}\left[EI(r)\frac{\partial^2 y}{\partial r^2}\right] = -\zeta A(r)\frac{\partial^2 y}{\partial T^2} + \frac{\partial^2 y}{\partial r^2} \int_{\zeta_r}^R A(\xi)\frac{\xi}{5} 50g d\xi$$

$$- \zeta A(r)\frac{r}{R} 50g \frac{2y}{2r} + M_1 50g \frac{\partial^2 y}{\partial r^2}$$

In order to establish static and dynamic balance of the centrifuge, a system of servoed balancing weights on the centrifuge platform may be provided. Such a system would perform the required balancing function and would precisely adjust the orientation of the test package relative to inertial space.

A critical parameter of centrifuge performance is speed of angular rotation. The speed must be accurately controlled so that angular acceleration of the test packages will be within certain precise limits. To this end a precision tachometric feedback control system or a tone wheel frequency generator could be used to advantage.

In order to establish static and dynamic balance of the centrifuge, a system of servoed balancing weights on the centrifuge platform may be provided. Such a system would perform the required balancing function and would precisely adjust the orientation of the test package relative to inertial space.

A critical parameter of centrifuge performance is speed of angular rotation. The speed must be accurately controlled so that angular acceleration of the test packages will be within certain precise limits. To this end a precision tachometric feedback control system or a tone wheel frequency generator could be used to advantage. Angular timing equipment may be employed to calibrate precisely the speed control system. For example, optical, electromagnetic and capacitive impulse generators could be attached to the periphery of the centrifuge. The periphery of the conical centrifuge is sufficiently large as to achieve precise timing of fractional as well as full revolutions.

Measurement and adjustment of the plane of rotation of the test package under dynamic conditions may be implemented through the use of an automaic optical collimating system (not shown) wherein the plane of rotation of a mirror attached to the center of rotation of the centrifuge would be observed by a vertically oriented auto-collimator located below the centrifuge spindle. The system operates in such a manner that the tilt and wobble of the axis of rotation can be dynamically read out and the signals so obtained can be used to trim the verticality of the axis.

The angular orientation of the test package relative to the plane of rotation should be monitored and adjusted over both static and dynamic conditions. This may be done by employing an automatic auto-collimating system on the rotating member of the centrifuge. Typically, a mirror may be attached to the test package mounting platform or to the test package itself and the auto-collimator mounted near the spindle to permit alignment with respect to the spindle axis mirror. The signals obtained would represent the pitch (droop) and yaw of the test package relative to the centrifuge arm radius vector.

Motion of the test package in twist or torsion about the centrifuge arm radius could be measured by a separate optical system comprising a stationary and horizontal light beam mounted just outside the centrifuge periphery. A prism or mirror would be attached to the test package platform which would reflect part of the light beam radially, and part of the light beam would be reflected in a plane perpendicular to the centrifuge arm radius vector. Photoelectric sensors may be mounted to receive these two reflected light beams. If there is no twist of the test package platform, the electric pulses generated by the photo electric system would be coincident in time. Any twist present would create a time difference between the two pulses. This letter signal could be used to adjust the test package orientation in three axes relative to the plane of rotation of the centrifuge.

Vibration sensors or accelerometers may be included on the test platform, if desired, to measure whatever vibration might be present.

The accelerator is mounted in a circular housing indicated generally by the reference character 14. The accelerator housing, in turn, is located within a building of conventional construction and having a bridge crane of about five tons capacity supported from overhead to furnish maintenance handling facilities for the accelerator and its housing.

A contoured-profile aerodynamic ceiling 60 may be constructed of heavy gage steel reinforced with radial and circumferential stiffeners 62 and 64. The ceiling is self-supporting for the full span and should be fabricated in sector units capable of removal for major maintenance work on the accelerator. As best seen in FIG. 2 the roof 60 slopes at a 20° angle down from a circular cap 66 as to follow the 20° conical surface of the rotor. The peripheral portion of the roof is stepped as at 68 to accommodate the upper portion of the pods 16. Similarly, the accelerator pit is horizontally flat with a circumferential recess 70 to accommodate the lower portion of the pod.

While the invention has been described with particular reference to the illustrated embodiment, it will be understood that numerous modifications will appear to those skilled in the art without departing from the invention.

Having thus described my invention, what I claim and desire to obtain by Letters Patent of the United States is:

1. A rotary accelerator for testing inertial devices, comprising a seismic footing, a fixed spindle vertically mounted on said footing, said spindle having a cylindrical bearing surface extending peripherally about the lower portion thereof and being formed at its upper end with a spherical bearing portion, a rotor assembly mounted for rotation about the axis of said spindle, said rotor assembly being provided with a mating spherical bearing cap mounted over the spherical portion of said spindle and rotatable with said rotor assembly, said rotor assembly being further provided with radial bearing elements rotatable with said rotor in spaced relation to the lower bearing surfaces, means for introducing pressurized fluid between the spindle bearing surfaces and the rotor bearing surfaces, said rotor assembly being in the form of a frustum of a right circular cone concentric with said spindle, a conical outer skin rigidly mounted to and forming part of said rotor assembly, stationary armature windings fixed to said spindle and rotary field windings fixed to said rotor, excitation of said field windings being operative to rotate said rotor assembly about said spindle, test pods mounted peripherally about said rotor for housing said inertial devices, and a housing enclosing said accelerator, said housing having an inner configuration that generally conforms in spaced relation to the outer configuration of the rotor assembly.

2. A rotary accelerator for testing inertial devices, comprising a seismic footing, a fixed spindle vertically mounted on said footing, said spindle having a cylindrical bearing surface extending peripherally about the lower portion thereof and being formed at its upper end with a spherical bearing portion, a rotor assembly mounted for rotation about the axis of said spindle, said rotor assembly being provided with a mating spherical bearing cap mounted over the spherical portion of said spindle and rotatable with said rotor assembly, said rotor assembly being further provided with radial bearing elements rotatable with said rotor in spaced relation to the lower bearing surfaces, means for introducing pressurized fluid between the spindle bearing surfaces and the rotor bearing surfaces, said rotor assembly being in the form of a frustum of a right circular cone concentric with said spindle, a stiff outer skin of conical configuration rigidly mounted to and forming part of said rotor assembly, stationary armature windings fixed to said spindle and rotary field windings fixed to said rotor, excitation of said field windings being operative to rotate said rotor assembly about said spindle and test pods mounted peripherally about said rotor for housing said inertial devices.

3. A rotory accelerator for testing inertial devices, comprising a base, a spindle vertically mounted on said base, a rotor assembly mounted for rotation about the axis of said spindle, a hydrostatic bearing mounting said rotor assembly on said spindle, said rotor assembly being in the form of a circular cone concentric with said spindle, a stiff outer skin of conical configuration rigidly mounted to and forming part of rotor assembly, stationary armature windings fixed to said spindle and rotary field windings fixed to said rotor, excitation of said field windings being operative to rotate said rotor assembly about said spindle, test pods mounted peripherally about said rotor for housing said inertial devices and a rigid housing enclosing said accelerator, said housing having an inner configuration that generally conforms in spaced relation to the outer configuration of the rotor assembly.

4. A rotary accelerator for testing inertial devices, comprising a vertically mounted spindle, a rotor assembly mounted for rotation about the axis of said spindle, said rotor assembly being in the form of a cone concentric with said spindle, said rotor assembly having a continuous outer conical surface, power means operative to rotate said rotor assembly about said spindle, means for mounting said inertial devices peripherally about said rotor, and a housing enclosing said accelerator, said housing having an inner configuration that generally conforms in spaced relation to the outer configuration of the rotor assembly.

5. A rotary accelerator for testing inertial devices, comprising a vertically mounted spindle, a rotor assembly mounted for rotation about the axis of said spindle, said rotor assembly being in the form of a circular cone concentric with said spindle, stationary armature windings fixed to said spindle and rotary field windings fixed to said rotor, excitation of said field windings being operative to rotate said rotor assembly about said spindle, test pods mounted peripherally about said rotor for containing said inertial devices and a rigid housing enclosing said accelerator and generally conforming in spaced relation to the contours of said rotor.

6. A rotary accelerator for testing inertial devices, comprising a seismic footing, a fixed spindle vertically mounted on said footing, and being formed at its upper end with a spherical bearing portion, a rotor assembly mounted for rotation about the axis of said spindle, said rotor assembly being provided with a mating spherical bearing cap mounted over the spherical portion of said spindle and rotatable with said rotor assembly, means for introducing pressurized fluid between the spindle bearing surfaces and the rotor bearing surfaces, said rotor assembly being in the form of a frustum of a continuously surfaced right circular cone concentric with said spindle, stationary armature windings fixed to said spindle and rotary field windings fixed to said rotor, excitation of said field windings being operative to rotate said rotor assembly about said spindle and test pods mounted peripherally about said rotor for housing said inertial devices.

7. A rotary accelerator for testing inertial devices, comprising a base, a spindle vertically mounted on said base, a rotor assembly mounted for rotation about the axis of said spindle, a hydrostatic bearing mounted on said spindle and supporting said rotor assembly, said rotor assembly being in the form of a continuously surfaced cone concentric with said spindle, stationary armature windings fixed to said spindle and rotary field windings fixed to said rotor excitation of said field windings being operative to rotate said rotor assembly about said spindle and test pods mounted peripherally about said rotor for housing said inertial devices.

8. A rotary accelerator for testing inertial devices, comprising a base, a spindle vertically mounted on said base, a rotor assembly mounted for rotation about the axis of said spindle, a hydrostatic bearing mounted on said spindle and supporting said rotor assembly, means for introducing pressurized fluid to said hydrostatic bearing, said rotor assembly being in the form of a frustum of a continuous surfaced right circular cone concentric with said spindle, stationary armature windings fixed to said spindle and rotary field windings fixed to said rotor, excitation of said field windings being operative to rotate said rotor assembly about said spindle and means for mounting said inertial devices peripherally about said rotor.

9. A rotary accelerator for testing inertial devices, comprising a base, a spindle vertically mounted on said base, a rotor assembly mounted for rotation about the axis of said spindle, a hydrostatic bearing mounting said rotor assembly on said spindle, said rotor assembly having a stiff outer skin in the form of a circular cone closed across its base concentric with said spindle, power means being operative to rotate said rotor assembly about said spindle and means for mounting said inertial devices peripherally about said rotor.

References Cited by the Examiner

UNITED STATES PATENTS

| | | | |
|---|---|---|---|
| 650,529 | 5/00 | Eggeman | 233—26 |
| 1,529,890 | 3/25 | Hoppes | 272—33 |
| 2,522,941 | 9/50 | Gillen | 310—67 X |
| 2,729,106 | 1/56 | Mathiesen. | |
| 2,788,654 | 4/57 | Wiancko et al. | 73—1 |
| 2,814,944 | 12/57 | Brown | 73—1 |
| 2,882,717 | 4/59 | Brown | 73—1 |
| 2,888,878 | 6/59 | Cobb | 308—9 X |

OTHER REFERENCES

Schaevitz Machine Works Publication "Rotary Accelerator Model C–1–A" Bulletin E–4.

ISAAC LISANN, *Primary Examiner.*